United States Patent [19]

Marcus

[11] 4,229,724

[45] Oct. 21, 1980

[54] VEHICLE POSITION INDICATOR WITH SELECTABLE POSITION ALARM MEANS

[75] Inventor: Konrad H. Marcus, Holland, Mich.

[73] Assignee: Prince Corporation, Holland, Mich.

[21] Appl. No.: 821,779

[22] Filed: Aug. 4, 1977

[51] Int. Cl.[2] ........................ G08G 21/00; G06F 15/20

[52] U.S. Cl. ................................ 340/23; 235/92 DN; 235/92 EV; 235/92 PL; 235/92 PE; 364/424; 364/460

[58] Field of Search .................................. 340/23, 24; 179/100.1 C; 364/449, 424, 460; 360/4, 6, 12; 235/92 DN, 92 R, 92 EV, 92 PL, 92 PE

[56] References Cited

U.S. PATENT DOCUMENTS

| | | | |
|---|---|---|---|
| 2,928,186 | 3/1960 | Hirsch | 340/23 |
| 2,965,720 | 12/1960 | Bumstead et al. | 340/23 |
| 3,596,010 | 7/1971 | Patterson | 340/23 |
| 3,711,653 | 1/1973 | Barbier | 340/23 |
| 3,824,534 | 7/1974 | Straumsues | 340/24 |
| 3,845,289 | 10/1974 | French | 340/24 |
| 4,028,531 | 6/1977 | Cottin et al. | 340/24 |
| 4,068,307 | 1/1978 | Floyd et al. | 340/23 |
| 4,068,308 | 1/1978 | Opper | 364/449 |
| 4,103,332 | 7/1978 | Floyd et al. | 364/424 |
| 4,145,605 | 3/1979 | Marcus | 364/460 |

*Primary Examiner*—John W. Caldwell, Sr.
*Assistant Examiner*—James J. Groody
*Attorney, Agent, or Firm*—Prince, Heneveld, Huizenga & Cooper

[57] ABSTRACT

A position indicator for automobiles, trucks, and other vehicles includes a numerical display of the vehicle position with respect to an interstate highway by providing a readout of the mile marker location of the vehicle. The display is actuated by an electrical circuit including a presettable up/down counter in which the initial location of the vehicle with respect to a reference marker along the highway is stored. Subsequent vehicle movement increments or decrements the stored count in response to the receipt of vehicle movement pulses from a pulse generator. A calibration circuit is provided to accurately calibrate the system for different vehicles. In one embodiment, a digital keyboard is provided for entering the initial vehicle position information as well as position information as to events along the roadway. A memory circuit is employed to store, for subsequent recall and display, the event locations. A warning system is provided to alert the driver with a visual and/or audible alarm when the vehicle approaches one of the stored event locations.

24 Claims, 4 Drawing Figures

VEHICLE POSITION INDICATOR WITH SELECTABLE POSITION ALARM MEANS

BACKGROUND OF THE INVENTION

The present invention relates to a position indicator.

Since the relatively recent interest in citizens band (CB) radio for use in automobiles, two-way communication between motorists is becoming commomplace. Thus, traffic conditions, road hazards, and the like are frequently reported between passing motorists as they travel along the highways by the use of their CB radios.

In order for such information to be useful, the CBers must be capable of reporting their position or that of an event of interest to their fellow travelers. The parlance developed by the CB enthusiasts is to refer to such locations as their "10-20," a numerical code abbreviation for the reported location of the transmitter or something being reported. Along interstate highways, there are accurately positioned mile markers which are spaced exactly at one mile increments and either increase or decrease as to the location identified depending on the direction of travel along the roadway. These markers have been in use for several years by emergency vehicles and highway crews for their work. The CB radio enthusiasts have also found the equally spaced mile marker signs helpful in reporting their location as well as the location of events they are reporting to other motorists which they have witnessed during their travel. Since the mile markers, depending upon the direction of travel either increment or decrement, they provide accurate bench marks for all motorists on a given highway.

SUMMARY OF THE INVENTION

In order to facilitate the efficient use of the mile marker indicators currently available on almost every interstate highway as well as to provide a helpful motorist aid for both the CB enthusiasts as well as professionals such as law enforcement agents, truckers and highway and service vehicles, the present invention provides a unique vehicle position indicator. The vehicle position indicator provides a digital display in mileage which corresponds to the mile marker locations and in increments of tenths of a mile between mile markers.

The position indicator of the present invention includes a source of information representative of the distance traveled by a vehicle, means coupled to the source for storing predetermined location information and means for providing information representative of the vehicle position with respect to the predetermined location as it moves toward or away from the location and a display means coupled to the providing means for displaying the current vehicle position.

In the preferred embodiment of the invention for use with highway vehicles, the display provides a mileage marker readout in tenths of a mile such that the vehicle operator knows within this accuracy the exact position of the vehicle between mile markers. By providing such a system, the vehicle operator, and particularly, one utilizing a CB radio has a continuous digital readout of the vehicle's "10-20" which is helpful in reporting events to others and providing an advanced warning of upcoming mile marker locations such as exits, traffic accidents, or the like which have been brought to the operator's attention. Thus, the vehicle position indicator of the present invention provides an extremely helpful adjunct to the CB radio. In one embodiment of the invention, memory circuit means are provided for storing a plurality of events in terms of their mile marker locations such that one or more of them can be recalled for display by the vehicle operator on demand. According to still a further aspect of the invention, an audio and/or visual alarm system is provided for alerting the vehicle operator to a forthcoming mile marker event stored in one of the memory locations.

These and other objects, advantages and features of the present invention will become apparent upon reading the following description thereof together with reference to the accompanying drawings in which:

DETAILED DESCRIPTION OF THE PREFERRED EMBODIMENT

Figure 1:
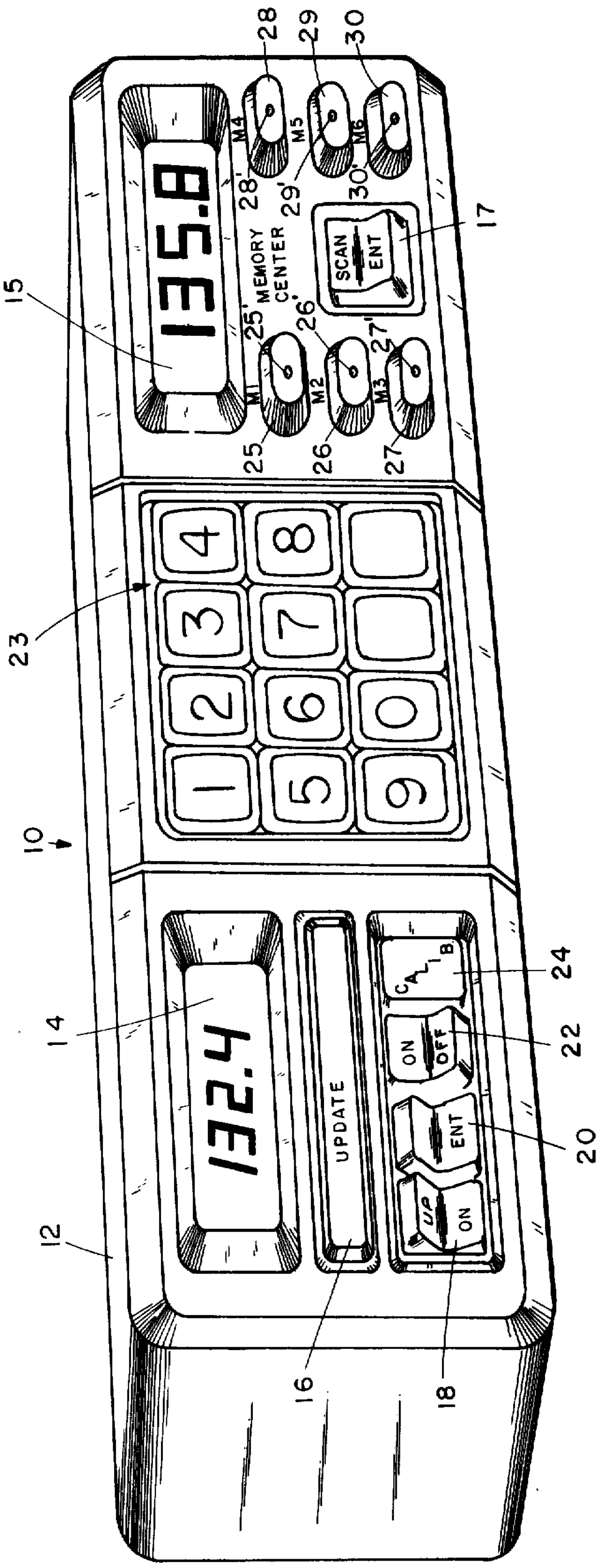
FIG. 1 is a perspective view of a vehicle position indicator according to the preferred embodiment of the present invention.

Referring initially to FIG. 1, there is shown a vehicle position indicator 10 embodying the present invention. The indicator is housed in a rectangular enclosure 12 suitable for mounting in a vehicle such as an automobile either under the dashboard utilizing conventional mounting hardware or at some other location convenient for the operator. The enclosure is preferably made by injection molding utilizing a thermoplastic material such a polyethelene or the like. In the upper left corner of the front panel of enclosure 12 there is included a four digit digital display 14 which can be of the light emitting diode (LED) type, liquid crystals (LCD) or other commercially available illuminated or light reflective displays. Display 14 is employed for providing a continuous display of the vehicle's current mile marker position. In the upper right hand corner is a second 4 digit display 15 employed as more fully discribed below for selectively displaying information from the memory section of the system.

The controls for the vehicle position indicator include a push button momentarily actuated update switch 16 positioned immediately below display 14. Below the update switch there is provided a plurality of control switches including a count up/down rocker switch 18, a momentarily actuated enter switch 20, a power on/off switch 22, and a momentarily actuated calibrate switch 24.

Positioned to the right of display 14 is a data entry keyboard 23 including keys corresponding to the ten digits numbered 1-9 and 0 as well as to spare binary operated switches, unlabeled, in the Figure. In addition to display 15, the memory section includes a two position memory scan or enter switch 17 and in the preferred embodiment six memory select switches 25—30 each with an associated indicator light 25'-30' respectively for indicating which of the six memory location's data is being displayed by display 15. Switches 17–25 are commercially available as is keyboard 23.

Figure 2:
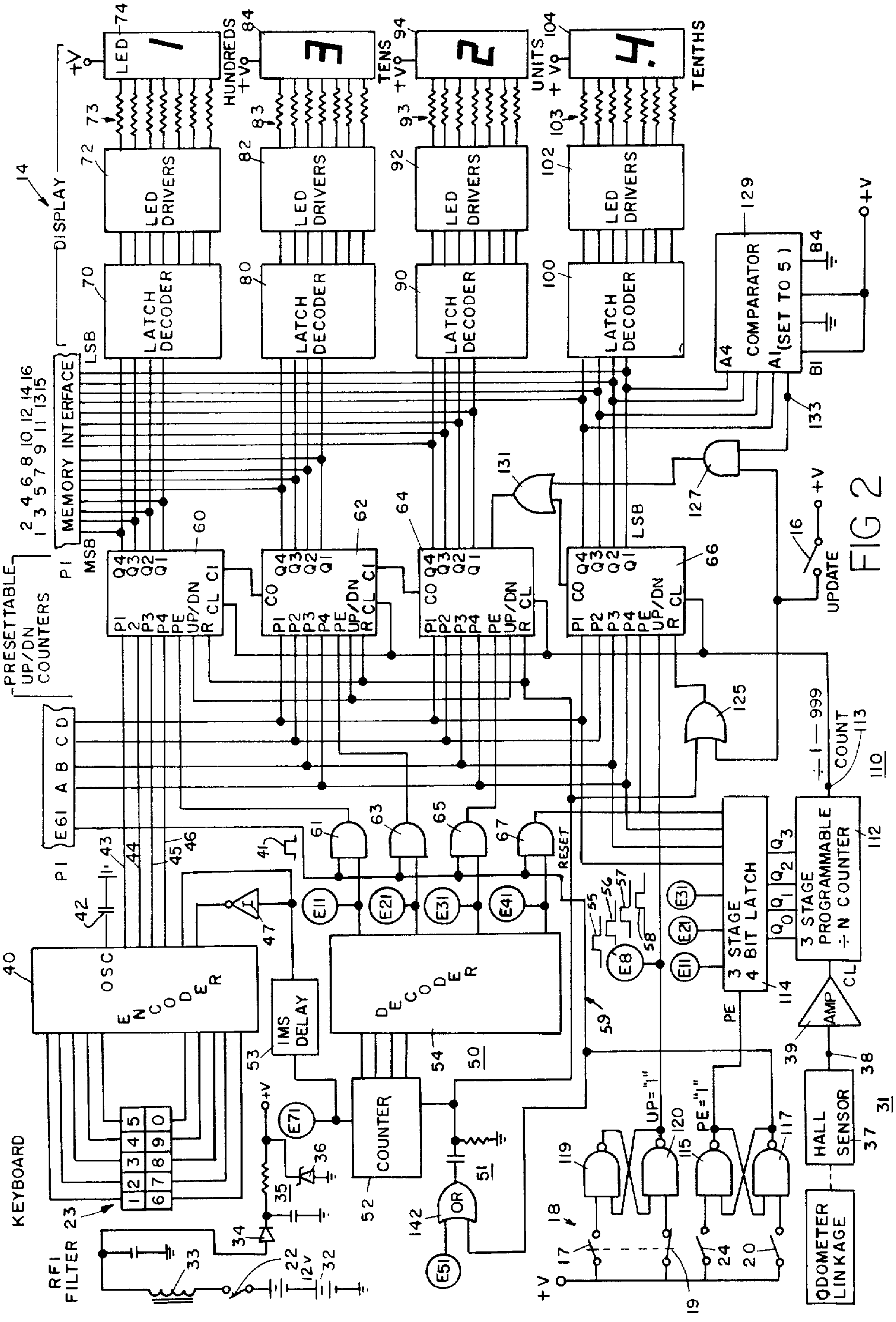
FIG. 2 is an electrical circuit diagram partly in block and schematic form of a portion of the electrical circuit employed in the vehicle position indicator shown in FIG. 1.
Figure 3:
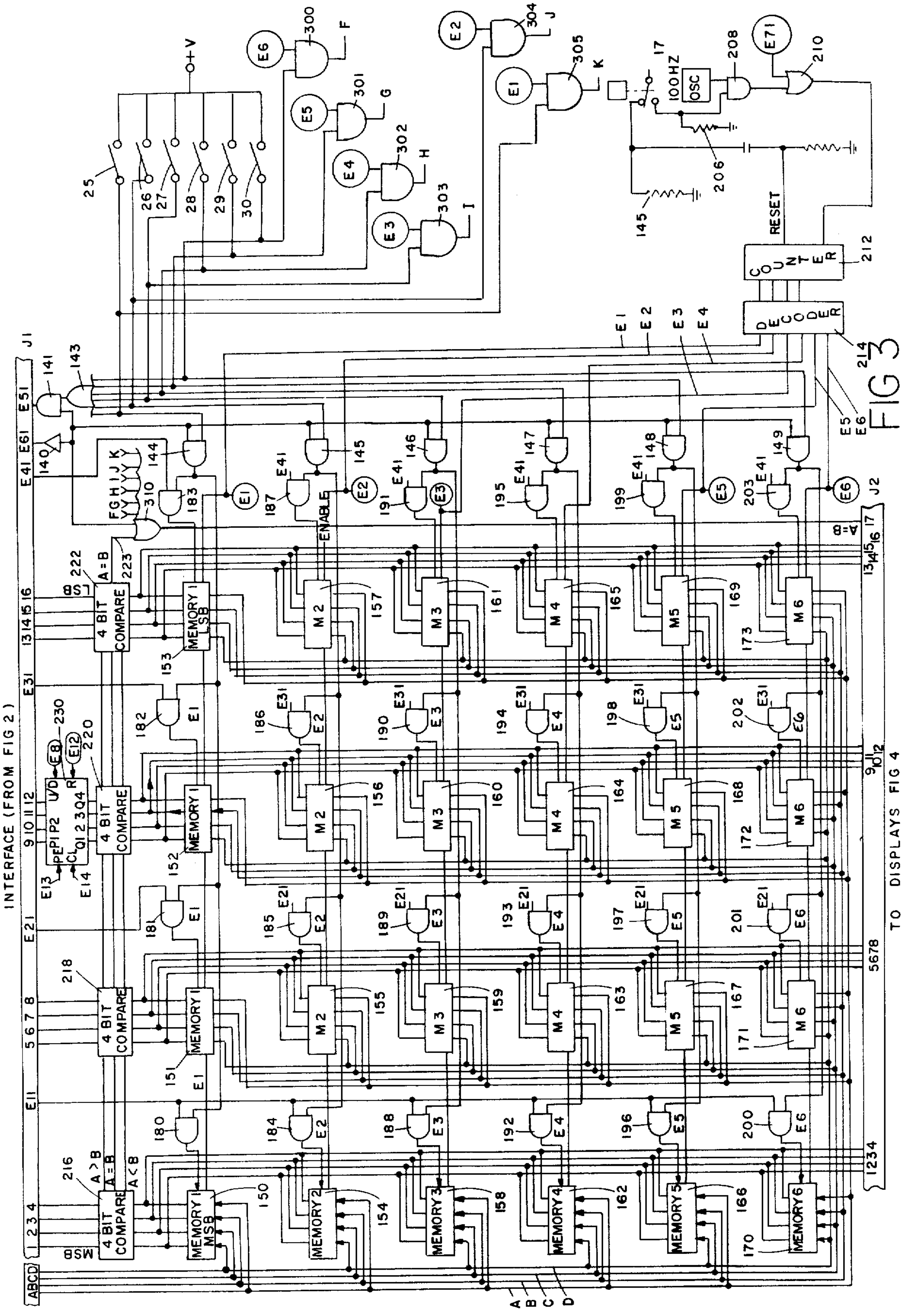
FIG. 3 is an electrical circuit diagram partly in block and schematic form showing additional electrical circuits used in the vehicle position indicator.
Figure 4:
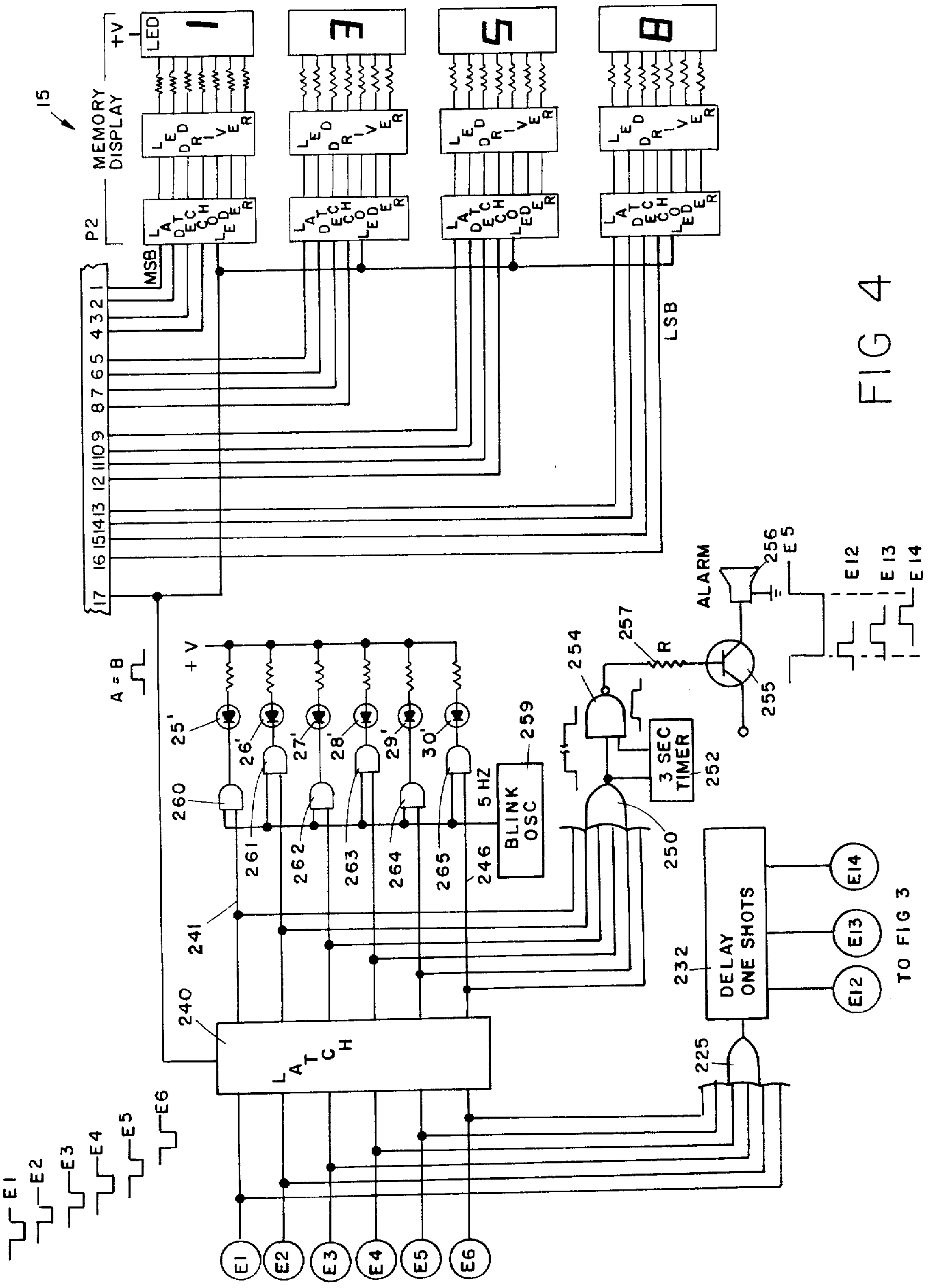
FIG. 4 is an electrical circuit diagram partly in block and schematic form showing the remaining electrical circuits used in the vehicle position indicator.

Before describing the operation of the vehicle position indicator as shown in FIG. 1, a detailed description of the electrical circuitry incorporated within housing 12 is presented in conjunction with FIGS. 2–4. Basically, the system includes a source 31 for information representative of the distance traveled by a vehicle, the displays 14 and 15 and electrical circuit means for storing information representative of a predetermined location and coupled to source 31 for providing current vehicle information signals to be displayed by display 14 as the vehicle moves to or from a predetermined location and storage circuit means for storing a plurality of position locations for subsequent recall and display by display 15.

In the embodiment shown, power is supplied to the electrical circuitry from the vehicle's 12-volt battery 32 (FIG. 2) through the power on/off switch 22 and a radio frequency interference filter LC network 33. A reverse polarity protection diode 34 is provided at the output of filter 32 and an RC filtering network 35 couples the output of diode 34 to a zener diode 36 extending from the voltage output terminal +V to ground. Diode 36 serves to prevent overvoltage from damaging the electrical circuit components and is a commercially available diode preferably having a reverse breakdown voltage of in the neighborhood of ten volts. The system's supply voltage terminal +V is coupled to each of the circuit components in a conventional manner. For the sake of simplification of the circuit diagram, all of the interconnections between the voltage source +V and the various circuit components is not shown. It is understood that similarly identified circuit terminals are interconnected.

Before describing the detailed circuit construction, a brief overview of the major circuit components is noted. The system comprises four 4-bit presettable up/down counters 60, 62, 64 and 66 which can be preset through the digital keyboard 23 to a known mile marker location. Subsequent pulses from the sensing circuit 31 are then applied to these counters for either incrementing or decrementing the stored location information such that the output from the presettable counters which is applied to the display circuit 14 represents the current vehicle location. In order to provide calibration of the system, the pulses from source 28 are selectively divided by a preset number depending upon the type of vehicle such that for each tenth of a mile traveled, the counter for the least significant bit receives a pulse to increase or decrease the displayed output signal by one digit.

Also, in order to periodically correct for mileage deviations due, for example, to the changing of lanes by the vehicle between mile markers, tire slippage under slippery road conditions, or the like, the update switch 16 is employed to round off the least significant digit. This is done as the vehicle passes a mile marker in the event the displayed mile marker location does not exactly correspond to the mile marker being passed by the vehicle. The storage circuits shown in FIG. 3 are employed to selectively store and retrieve up to 6 mileage marker locations while the circuit of FIG. 4 includes display 15 and the warning control circuit. FIGS. 2, 3 and 4 are interconnected as shown by the plugs P1 and P2 and associated jacks J1 and J2 interconnecting the similarly identified terminals; although in practice these circuits may be mounted on a single circuit board or even incorporated in large part for an integrated circuit chip according to know technology.

In order to enter the binary data from the ten separate line outputs of keyboard 23 into the presettable up/down counters, the keyboard 23 outputs are coupled to a commercially available encoder 40. Encoder 40 can, for example, be a commercially available integrated circuit chip which internally includes a synchronization oscillator, the frequency of which is selected by externally coupled capacitor 42. Encoder 40 responds to a single binary input on a line from one of the keyboard keys to provide a 4-bit binary output signal on output lines 43–46 and to terminals A, B, C and D to Plug P1. The standard 4-bit binary format is representative of the numerical key. Thus, conductor 43 represents the number $2^0$, 44 represents $2^1$, 45 represents $2^2$, and 46 represents $2^3$.

As each of the keyboard keys is actuated by the operator in order to sequentially enter the binary output signals representative of such key from the encoder 40 to the presettable counters 60, 62, 64 and 66, a keyboard sequencer circuit 50 is employed. The clock output pulse 41 from encoder circuit 40 is applied to a clock input terminal of counter 52 and terminal E71 through a one millisecond delay circuit 53. Counter 52 responds to successive clock pulses 41 generated each time a keyboard key is actuated to provide successive 4-bit binary output signals applied to the input of a decoder circuit 54. Circuit 54 responds to the counter output signals to provide on four output lines thereof, four time sequential output enable signals 55, 56, 57 and 58 which are applied to the enable input terminals PE of counters 60, 62, 64 and 66, respectively through AND gates 61, 63, 65 and 67, respectively, which are enabled by a logic '1' generated by the enable switch 20. These pulses are also applied to terminals E11, E21, E31 and E41 respectively for coupling to the circuits of FIGS. 3 and 4.

Thus, in the example shown in FIG. 2, as the key representing numeral 1 is actuated, pulse 55 is generated to enable counter 60 to store the 4-bit binary data on input lines 43–46 which causes the hundredths digit 1 to be displayed by display means 14. As the second digit 3 is actuated by the operator, pulse 56 is generated activating counter 62 to read this binary information and cause its display as a 3 in the tenths digit location of the display. Subsequently, actuation of the unit's digit 2 causes the activation of generation of pulse 57 from decoder 54 activating counter 64 for storing this digit and causing its display on the unit's location of display 14. Finally, as the tenths digit 4 is actuated by the operator, pulse 58 enables counter 66 causing the storage and display of the 4 digit in the tenths display location. The delay circuit 53 assures that enabling pulses 55–58 are generated slightly after the keys are actuated by the operator to enter the data on lines 43–46 in the desired counter. The clock pulse 41 is also applied internally to encoder 40 through an inverter circuit 47 to eliminate contact bounce and to indicate the existence of valid data at the output. The keyboard data sequencer comprises integrated circuit chips 52 and 54 which are commercially available. Similarly, the presettable up/down counters 60, 62, 64, and 66 are commercially available integrated circuit chips. Counter 52 and counters 60, 62, 64 and 66 also include reset input terminals R with an RC differentiator circuit 51 coupled to the input to reset line 59 to provide a sharp reset pulse.

Each of the presettable up/down counters includes four input terminals $P_1$–$P_4$ coupled to data lines 43–46, respectively, and four output conductors from output terminals $Q_1$–$Q_4$, respectively, which are applied to the respective display modules. Display 14 includes a hundredths display module including a latch decoder circuit 70, a LED driver circuit 72 and the LED display modules 74. Each of these circuits is commercially available and is coupled in a conventional manner with current limiting resistors 73 positioned between the driver circuit 72 and the seven line input terminals for the display 74. Display 74 provides the hundredths display which, for the example shown in the Figure, is the reference numeral 1. Similarly, the tenths display module includes a latch decoder circuit 80, having its input terminals coupled to the output of counter 62 and output terminals coupled to the input terminals of LED driver circuits 82. Seven serially coupled current limiting resistors 83 couple the output terminals of the driver circuit 82 to the LED display 84 providing the tenths display. The unit's display includes a latch decoder 90 coupled to the outputs of counter 64 and its output terminals coupled to the inputs of the driver circuit 92. The driver output terminals are coupled to the inputs of unit display 94 through series resistors 93. Finally, the tenths display includes a latch decoder circuit 100 having its input terminals coupled to the output of the least significant bit counter 66 and having its output terminals coupled to the input of the driver circuit 102. The output of driver circuit 102 is coupled to the input of the LED display module 104 through series resistors 103. Circuits 70–104 are all commercially available modules interconnected in a conventional manner.

In order to vary the information displayed by display 14 as a function of vehicle position, source 28 is provided. Source 28 includes a commercially available hall effect sensor 37 mechanically coupled to a suitable moving element such as the odometer cable of the vehicle for providing pulses at an output terminal 38 thereof. These output pulses are applied to a shaping amplifier 39 to provide square wave output pulses therefrom. Circuits 37 and 39 are commercially available units such as employed with speed control units employed in the automotive industry. One such commercially available unit is manufactured by the Microswitch Corporation, Model 103SR.

Inasmuch as for each tenth of a mile traversed, it is desired that the tenths display 104 increments or decrements exactly one digit, a calibration circuit 110 is provided. Circuit 110 comprises a three-stage, programmable divide-by-N counter 112, each stage of which comprises a commercially available integrated circuit which can be programmed to divide the input pulses by a range of 1-999 to effect the desired calibration for a given vehicle. Typically, the number N by which the counter divides is selected by trial and error for a given vehicle and can be programmed into the counter 112 by the keyboard 23. It has been found, for example, that the number N for a 1977 Continental is 790. This number naturally will vary for a given vehicle when the vehicle's tires or the like are changed. This number can be ascertained by driving the vehicle over one mile intervals and changing the scaling number N depending upon whether or not the display has been changed by exactly one mile. If the display for the one mile traversed increments or decrements by greater than one mile, N is increased. If on the other hand the display increments or decrements by less than one mile, the number N is decreased. In order to program the counter 112, three-stages of 4-bit latch circuits 114 are provided and enabled by the calibrate switch 24 through cross-coupled NAND gates 115 and 117. Once switch 24 is closed, gates 61, 63, 65 and 67 are inhibited, thus, steering the keyboard output to the appropriate 4-bit latch 114. Closing switch 24 causes gate 115 to provide a logic output '1' signal applied to the enabling input terminals of the three latches 114 such that the 3-bit number N supplied by keyboard 23 and enabled in the same manner as provided into the presettable up/down counters (via interconnections E11, E21 and E31) is entered into the latch 114 and subsequently to the counter 112 coupled to the output terminals of the latch 114.

The output 113 of counter 112, once the number N is programmed, provides a single pulse for each tenth of a mile traversed by the vehicle and is applied to the synchronously coupled programmable up/down counters 60–64 at the clock input terminals identified as CL in the Figure. Depending upon the vehicle's direction, the up/down switch 18 will control counters 60–66 to either increment or decrement the count stored in the counters. This is accomplished by the selection of up/down switch 18 having switch contacts 17 and 19, respectively. Switch contacts 17 and 19 are coupled to input terminals of cross-coupled NAND gates 119 and 120, respectively, defining a latch to provide an output logic '1' signal when switch 18 is in the up position, closing contact 19 or a logic output '0' when switch 18 is in the down position, closing contact 17. The logic '1' or logic '0' on output conductor 121 is applied to the up/down direction input terminal of each of the counters 60, 62, 64 and 66 causing the counters to respond to the pulse output from counter 112 to either increment or decrement the stored and displayed information.

As noted earlier, changing lanes, tire slip on slippery road conditions can, even though the system is accurately calibrated, cause the display output to deviate slightly from the actual mile markers traversed. Accordingly, the update feature provided includes a momentary push button switch 16 providing a logic '1' signal to the input of OR gate 125 having its remaining input coupled to the reset line 59 and its output terminal coupled to the reset input terminal R of counter 66. The update pulse is also applied to one input of AND gate 127 having its remaining input terminal coupled to output terminal 133 of a digital comparator circuit 129. Circuit 129 has one set of input terminals, $B_1$–$B_4$, selectively coupled to the +V supply to program it for the number 5. The remaining input terminals, $A_1$–$A_4$, for the signal information to be compared with the preprogrammed number are coupled to the four output lines of the least significant bit counter 66. Actuation of update switch 16 always resets counter 66 to zero. In the event the least significant bit is 5 or greater, output terminal 133 of comparator 129 is applied to gate 127 together with the update pulse from switch 16 provides a logic output '1' signal applied to OR gate 131 causing the unit's digit to increment to the next mile location. Thus, if the displayed mile marker location is less than one-half a mile higher than the actual location, actuation of the update button will zero the tens display to the mile marker. If it is one-half mile or less lower than the actual mile marker location, it will also zero the tens display to the actual mile marker. In the event the display is more than one-half a mile high, the unit's display is incremented to the next number. It may in some cases be necessary to reprogram the programmable counters through the keyboard 23 by entering the mile marker location. Once the system is calibrated, however, this will not normally occur. Operation of the basic unit is first described followed by a description of the memory and alarm section and its operation.

After the power on/off switch 22 is actuated to the on position calibration is achieved by first actuating the enter switch 20 which is a momentarily depressed, push button switch. Actuation of this switch sets the latch circuit comprising cross-coupled NAND gates 115 and 117 (FIG. 2) to a logic output '1', thus generating a reset pulse applied to the reset input terminal of counter 52 via the differentiator circuit 51 and to the presettable up/down counters 60, 62, 64 and 66 via line 59. Counter 52 and the up/down counters are thus all set to logic '0'. Next, as the operator passes a predetermined location such as a mile marker, he selectively enters the mile marker location through keyboard 23 into the up/down counters by sequentially depressing four of the keys starting with the hundredths display. As soon as each of the numbers is actuated and entered into the up/down counters, it is displayed by the respective LED module. Depending upon the direction of travel of the vehicle along the highway, the mile markers will be increasing or decreasing. Accordingly, the operator actuates the up/down switch 18 to the desired position which provides either a logic '1' or a logic '0' to the direction inputs of each of the presettable up/down counters via line 121.

The calibration procedure previously described is then completed by actuation of the calibration switch 24 which enables the latch comprised of cross-coupled NAND gates 115 and 117 to provide a logic '1' output to the three-stage latch circuits 114. The calibration number N can be provided by the automobile manufacturer if the system is sold as original equipment, by the manufacturer of the vehicle position indicator who can provide a chart for different vehicles, or by trial and error by the vehicle operator. As a starting point, the scaling factor N can be the number 700 entered into the latch 114 by the keyboard 23. The operator then travels along the highway for at least one mile between successive mile markers and checks the display output to see if it is incremented or decremented by the exact amount. If not, N is adjusted as noted above by reactuating switch 24 and adjusting the number N entered through the keyboard until such time as the display corresponds nearly exactly to the actual distance traveled between mile markers.

The power to latch circuit 114 and counter 112 is supplied from the input side of switch 22 to always provide the desired scaling factor between the pulse generating source 28 and the presettable up/down counters.

In place of using the keyboard and circuit 112 naturally a conventional digital thumbwheel switch can be employed to permanently program counter 112. Also it is noted that greater or fewer stages for circuits 112 and 114 can be provided as necessary to provide a suitable range for the scaling factor N.

The system is now operational and as the vehicle travels along the highway, the display 14 will display the vehicle's location in terms of tenths of a mile with respect to the mile marker posts. In the event the vehicle changes lanes a significant number of times, stops on the shoulder of the road, or slippage occurs between the wheels and the pavement due to icy road conditions or the like, it is possible that the display will not correspond exactly to the mile marker location which can be easily confirmed by visual checking of the display with a mile marker post as the vehicle passes such a post. As the vehicle passes the mile marker post, the operator momentarily depresses the update switch 16 which as noted above provides a round-off feature to round-off the display to the nearest unit display corresponding to the mile marker.

In order to provide stored information as to mile marker locations of interest to the vehicle operator such as mile markers indicating traffic conditions, road hazards and the like, the vehicle position indicator includes the memory and alarm circuitry shown largely in FIGS. 3 and 4. The memory circuit comprises six memory locations each including four 4-bit latches 150 through 173 (FIG. 3). In order to enter data into such memory circuits, the operator actuates switch 17 to the enter position (ENT in FIG. 1). Switch 17 which provides an output 1 signal to inhibit AND gates 61, 63, 65, and 67 (FIG. 2) thus preventing keyboard operation from affecting the current mileage display. This is accomplished by having the output pulse from switch 17 applied to terminal E61 to J1 and subsequently to the commonly coupled input terminals to these AND gates through an inverter circuit 140. Actuation of switch 17 simultaneously resets the keyboard sequence counter 52 through AND gate 141 and multiple input OR gate 143. This reset pulse is applied via terminal E51 and the two input OR gate 142 (FIG. 2) to achieve resetting of counter 52.

Actuation of switch 17 also enables one input of memory select AND gates 144 through 149 by their commonly coupled terminals also coupled to ground by means of resister 145'. With the keyboard now effectively coupled to the memory circuits through input terminals A, B, C, and D of J1 (FIG. 3) coupled to similar output terminals of P1 (FIG. 2), the vehicle operator can select a desired memory location for entry of a mile marker location of interest. This is achieved by actuating one of the memory select switches 25–30 which actuates a remaining side of one of the respective AND gates 144–149 for the memory circuit selected by the operator. The memory latch circuits 150–173 are actuated via the sequentially actuated AND gates 180 and 203 by the output signals from gates 144–149 and the sequentially applied pulses from the keyboard sequencer 50 (FIG. 2) outputs E11, E21, E31, and E41. Only the selected gates 180–203 associated with one of the selected memories, however, will be enabled to actuate such memory for entry of data therein. Thus for example if memory 5 is selected, gate 148 will be actuated thus enabling gates 196, 197, 198, and 199 upon receipt of the keyboard data on lines A, B, C and D upon actuation of the four successive keys entering the most significant bit into memory 166 by the E11 pulse, the next digit into memory 167 by the E21 pulse, the third digit into memory 168 by the E31 pulse, and the least significant bit into memory 169 by the E41 pulse. The operator can similarly enter data into each of the six memories to complete the programming of the memory section of the Vehicle Position Indicator.

It is desired to provide an automatic scanning system whereby as the vehicle travels along the roadway, information stored as to an event which is forthcoming will automatically cause an alarm signal to be activated in advance of the vehicle arriving at the mile marker of interest. Thus an advance warning system is provided. In order to provide an advance warning, however, it is necessary for the circuit to automatically scan each of the six memory locations and compare their stored data with that of the vehicle's current position. This is achieved by the circuit now described.

In order to scan the memories, switch 17 is switched to the scan position which enables the memory scan oscillator circuitry consisting of oscillator 205, resistor 206, gates 208 and 210, counter 212, and decoder 214. Decoder 214 provides a sequence of pulses shown in FIG. 4 and identified as E1–E6 appearing at similarly identified terminals in the circuit diagram. These pulses are applied to their associated enable input terminals of memory latch circuits 150–173 which respond thereto to apply their stored data to the associated 4-bit comparators 216, 218, 220, and 222. Comparators 216–222 are 4-bit digital comparators conventionally intercoupled to provide at input terminal 223 a logic '1' when the inputs from J1 (through circuit 230) are the same as the stored data selectively and sequentially applied to the remaining comparator input terminals from memory circuits 150–173.

During the memory scan, each memory location is compared with the outputs of the mileage counter 60, 62, 64, and 66 with the unit mile counter information from counter 64 being incremented or decremented by a single mile to provide a warning one mile in advance of the actual stored mile marker location. This is achieved by providing an up/down counter 230 (FIG. 3) coupled between counter 64 and comparator 220. Counter 230 receives the actual mileage information from terminals 9 through 12 of J1 and increments or decrements this count by a clock pulse on input terminal E14 from the circuit shown in FIG. 4. The up/down direction is selected by input terminal E8 from FIG. 2 which is the direction of the count control signal also applied to counters 60 through 66 as well as its reset and parallel enable signals by input terminals E12 and E13 respectively. The incrementing or decrementing clock pulse is provided by applying the sequential pulses E1–E6 to a three stage one-shot delay circuit 232 via a six input OR gate 225 (FIG. 4). Pulse E12, E13 and E14 are shown in the wave form diagram below circuit 232.

Thus for the example shown in FIG. 1 from memory 5, counter 230 is reset and enabled to force the data corresponding to mile marker 135.8 once display 14 indicates the vehicle's position is at 134.8 (when traveling in a direction whereby mile markers are increasing). Thus the information from counter 64 is incremented or decremented by pulse E14 by the three output signals from circuit 232. This arrangement in affect forces the comparator 220 to compare not the actual vehicle position but instead such position incremented or decremented by one mile with the memory circuits as the memories are successively scanned.

The scanning cycle is repeated by the successive enabling of the six 4-bit memory circuits 150–173 successively applying their stored data to the comparators 216–222 while the information from counter 60–66 is continuously applied to the comparators until a comparison is made. At such time the output terminals 223 of comparator 222 provides a logic '1' output signal applied through the seven input OR gate 310 to output terminals 17 of J2. This signal is applied to the enabling input of a six input latch circuit 240 (FIG. 4) to enable this circuit to respond to the one of the successive pulses E1–E6 at which the coincidence occurred. Thus one of the outputs 241–246 will switch from a logic '0' to a logic '1' output state. The signal from pin 17 of P2 is also applied to the display circuit 15 enabling the display for displaying the memory location having data therein corresponding to the coincident detected.

Actuation of one of the output lines 241–246 of latch 240 provides in addition to the display of the mile marker location which the vehicle operator is approaching, also effects both the audio and visual alarms. An alarm such as a buzzer or chime is actuated by means of inputs 241–246 coupled to OR gate 250 to actuate a three second timer 252 in turn enabling NAND gate 254 to render transister 255 conductive. This couples an alarm 256 to the +V supply actuating the alarm for a period of approximately three seconds sufficient for the vehicle operator to note the approaching and displayed mile marker from storage. A current limiting resistor 257 in the base circuit of transistor 255 is provided for current protection. In addition each of the switches 25–30 is of the lighted variety in which LED's 25'–30' are associated and actuated by the signals on output terminals 241–246 together with the signal from a 0.5 HZ blinking oscillator 259. Thus one of NAND gates 260–265 will have one input terminal continuously actuated with its remaining input terminal intermittently actuated to light the memory switch which corresponds to the approaching mile marker.

It is noted here that display 15 is substantially identical to display 14 which is described in detail above. Hence a detailed description of the latch decoder, drivers and display themselves is not repeated here.

Once a comparison is made such that the audio and visual alarm is sounded and the mile marker in memory displayed to the vehicle operator, it will remain on display until the next comparison is made or the operator actuates switch 17 to the enter position. If however, the operator would like to selectively recall for memory for display any of the memory data this can be accomplished by actuating switch 17 to the scan position. The operator then actuates the desired one of the memory switches 25–30. This in turn enables one of the input of gates 300 to 305 which ends with the scanning inputs E1–E6 applied to these gates. The resultant enabling signal is applied to one of the eight inputs F–K of the eight input OR gate 310. Gate 310 responds to provide an enabling output signal on pin 17 of J2 which enables latch circuit 240 (FIG. 4) for displaying the selected memory data.

Thus the memory and alarm circuits shown in FIGS. 1, 3 and 4 provide a versatile and useful aid to the vehicle operator and can even be employed, if desired, independently of display 14.

The term vehicle as used herein encompasses highway vehicles as well as other transportation means such as vessels, airplanes or other moving objects which naturally can employ vehicle position indicators such as the type indicated herein for providing a reference display with respect to a predetermined location. This system, however, is uniquely suitable for interstate highway use by land vehicles where mile markers are employed. Similarly, the unit distance displayed can be any arbitrary unit such as nautical miles, kilometers, or the like since the unit distance is determined only by the scaling factor N which is operator selected. Various other applications of the present invention will be apparent to those skilled in the art as well as modifications to the specific embodiment disclosed and described herein without departing from the spirit or scope of the invention as defined by the appended claims.

The embodiments of the invention in which an exclusive property or privilege is claimed are defined as follows.

1. A vehicle position indicator comprising:

a source of information representative of the distance travelled by a vehicle;

means for storing information representative of a predetermined known location and coupled to said source for providing information representative of the vehicle position with respect to the known location as the vehicle moves toward or away from the known location;

display means coupled to said storage means for displaying to the vehicle operator the current vehicle position;

additional storage means for storing information representative of at least one predetermined location to which the vehicle is travelling;

vehicle operator actuated data entry means comprising a digital keyboard coupled to said storage means and to said additional storage means for permitting the vehicle operator to enter said predetermined known location information into said storage means and said at least one predetermined location information into said additional storage means;

comparator means coupled to said storage means and to said additional storage means for providing an output signal when the vehicle's position approaches said at least one predetermined location; and means coupled to said comparator means for alerting the vehicle operator in response to said output signal from said comparator means.

2. The system as defined in claim 1 and further including additional display means coupled to said additional storage means and to said comparator means for displaying information identifying said at least one predetermined location in response to said output signal from said comparator means.

3. The system as defined in claim 1 wherein said additional storage means includes storage locations for storing a plurality of different location signals and said system further includes scanning circuit means selectively coupling said storage locations to said comparator for repetitively scanning said storage locations and developing an output signal when information stored in any one of the storage location corresponds to an approaching vehicle position.

4. The system as defined in claim 1 wherein said means for storing information includes presettable up/down counter means.

5. The system as defined in claim 4 wherein said source comprises an electrical signal generator for providing pulses representative of incremental distance of travel of a vehicle and wherein said up/down counter means is an electrical circuit coupled to said signal generator.

6. A vehicle position indicator comprising:

a source comprising an electrical signal generator for providing pulses representative of incremental distance of travel of a vehicle;

means including a presettable up/down counter means for storing information representative of a predetermined known location, said up/down counter means is in an electrical circuit coupled to said signal generator for providing information representative of the vehicle position with respect to the known location as the vehicle moves toward or away from the known location;

display means coupled to said storage means for displaying to the vehicle operator the current vehicle position;

additional storage means for storing information representative of at least one predetermined location to which the vehicle is travelling;

vehicle operator actuated data entry means including a keyboard for the generation of signals representative of a predetermined location and circuit means coupling said keyboard to said up/down counter means for entering signals from said keyboard into said up/down counter means for permitting the vehicle operator to enter said predetermined known location information into said storage means and said at least one predetermined location information into said additional storage means;

comparator means coupled to said storage means and to said additional storage means for providing an output signal when the vehicle's position approaches said at least one predetermined location; and means coupled to said comparator means for alerting the vehicle operator in response to said output signal from said comparator means.

7. The system as defined in claim 6 and further including calibration circuit means coupled between said signal generator and said up/down counter means, said calibration circuit means including a programmable divide-by-N counter for dividing the output signals from said signal generator such that resultant signals from said calibration circuit represent a predetermined incremental distance of travel of a vehicle.

8. The system as defined in claim 7 and further including update circuit means for updating the display means to an incremental location display comprising a digital comparator having first input means coupled to said display means, second input means coupled to a signal source representing a predetermined display reference number and a comparison output, said update circuit further including an operator actuated switch and gate circuit means having inputs coupled to said operator actuated switch and to said output of said comparator and an output coupled to said up/down counter means and operable to round off the information in said up/down counter means in response to the actuation of said operator actuated switch for displaying an incremental location.

9. The system as defined in claim 8 wherein said keyboard comprises a plurality of single pole switches and wherein said circuit means comprises an encoder coupled to said switches and a keyboard sequencer circuit coupling said encoder to said presettable up/down counter means.

10. A vehicle position indicator comprising:

a source of signals representative of distance travelled by a vehicle;

presettable circuit means for storing data representative of a predetermined vehicle location and coupled to said source and responsive to signals therefrom for modifying the stored data to represent the current vehicle location as the vehicle moves;

first display means coupled to said presettable circuit means for displaying to the vehicle operator the current vehicle location;

memory circuit means and vehicle operator actuated digital keyboard for entering data in said memory circuit means representative of a plurality of locations;

comparator circuit means coupled to said presettable circuit means and to said memory circuit means for providing a control signal when data stored in said memory circuit means has a predetermined relationship to data from said presettable circuit means; and alarm means coupled to said memory circuit means and responsive to said control signal for providing an alarm signal to the vehicle operator indicating to the operator that the vehicle is approaching a location stored in said memory circuit means.

11. A vehicle position indicator comprising:

a source of signals representative of distance travelled by a vehicle;

presettable circuit means for storing data representative of a predetermined vehicle location and coupled to said source and responsive to signals therefrom for modifying the stored data to represent the current vehicle location as the vehicle moves;

first display means coupled to said presettable circuit means for displaying to the vehicle operator the current vehicle location;

memory circuit means and operator actuated means for entering data in said memory circuit means representative of a plurality of locations wherein said operator actuated means for entering data includes a data entry keyboard and interface circuit means coupling said keyboard to said presettable circuit means and said memory circuit means for entry of location data therein;

comparator circuit means coupled to said presettable circuit means and to said memory circuit means for providing a control signal when data stored in said memory circuit means has a predetermined relationship to data from said presettable circuit means; and alarm means coupled to said memory circuit means and responsive to said control signal for providing an alarm signal to the vehicle operator indicating to the operator that the vehicle is approaching a location stored in said memory circuit means.

12. The system as defined in claim 11 wherein said comparator circuit means comprises a digital comparator for comparing single location data, said system further including scanning circuit means coupling said memory circuit means to said comparator circuit means for sequentially comparing current vehicle location data with each of the plurality of locations data from said memory circuit means.

13. The system as defined in claim 12 and further including second display means and means for selectively coupling said second display means to said memory circuit means for displaying data stored in said memory circuit.

14. The systems as defined in claim 13 wherein said coupling means includes gate circuit means coupled to said comparator means and enabled by said control signal therefrom to display data from said memory circuit means when said predetermined relationships have been detected.

15. The system as defined in claim 14 wherein said alarm means includes an audible alarm.

16. The system as defined in claim 15 wherein said alarm means further includes a visible alarm.

17. A vehicle position indicator comprising:

signal generator means adapted to be coupled to a movable element of a vehicle for providing output pulses representing distance travelled by a vehicle;

a programmable counter having an input coupled to said signal generator means, an output terminal and means coupled to said programmable counter for programming said programmable counter to divide the pulses from said signal generator means by a predetermined scaling factor N;

presettable counter means having a pulse input terminal coupled to said output terminal of said programmable counter, said presettable up/down counter means including data output terminal means and preset data input terminal means;

display means coupled to said data output terminal means for displaying a vehicle's current location;

vehicle operator actuated digital keyboard coupled to said preset data input terminal means for entering data representing a predetermined location in said presettable counter means;

memory circuit means including a plurality of storage locations for storage of data representative of selective vehicle locations, said memory circuit means selectively coupled to said digital keyboard for entry of data representative of the selective vehicle locations in said storage locations;

comparator means selectively coupled to said memory circuit means and to said data output terminal for providing a control signal when data from said data output terminal has a predetermined relationship to data in said memory circuit means; and alarm means coupled to said comparator means and responsive to said control signal to provide an alarm signal to the vehicle operator.

18. The system as defined in claim 17 wherein said presettable counter means comprises an up/down counter and includes count direction control terminal means and said system further includes means coupled to said count direction control terminal means to provide control signals there to such that said counter selectively increments or decrements its stored count in response to said control signals.

19. A vehicle position indicator comprising:

signal generator means adapted to be coupled to a movable element of a vehicle for providing output pulses representing distance travelled by a vehicle, a programmable counter having an input coupled to said signal generator means, an output terminal and means coupled to said programmable counter for programming said programmable counter to divide the pulses from said signal generator means by a predetermined scaling factor N;

presettable counter means having a pulse input terminal coupled to said output terminal of said programmable counter, said presettable counter means comprising an up/down counter including count direction control terminal means, data output terminal means and preset data input terminal means;

means coupled to said count direction control terminal means to provide control signals thereto such that said counter selectively increments or decrements its stored count in response to said control signals;

display means coupled to said data output terminal means for displaying a vehicle's current location;

vehicle operator actuated data generating means including a digital keyboard coupled to said preset data input terminal means for entering signals representing a predetermined location in said presettable counter means;

memory circuit means including a plurality of storage locations for storage of data representative of selective vehicle locations, said memory circuit means selectively coupled to said data generating means for entry of data representative of the selective vehicle locations in said storage locations;

comparator means selectively coupled to said memory circuit means and to said data output terminal for providing a control signal when data from said data output terminal has a predetermined relationship to data in said memory circuit means; and alarm means coupled to said comparator means and responsive to said control signal to provide an alarm signal to the vehicle operator.

20. The system as defined in claim 19 and further including update circuit means for updating said display means to display an incremental vehicle location and comprising a digital comparator having first input means coupled to said data output terminal means, second input means coupled to a signal source representing a predetermined display reference number, and a comparison output, said update circuit further including an operator actuated switch and gate circuit means having inputs coupled to said operator actuated switch and to said output of said comparator and an output coupled to said up/down counter means and operable to round off the data information in said up/down counter means in response to the actuation of said operator actuated switch for displaying an incremental location.

21. The system as defined in claim 20 wherein said digital keyboard comprises a plurality of single pole switches, an encoder coupled to said switches, and a keyboard sequencer circuit coupling said encoder to said preset data input terminal means of said presettable up/down counter means.

22. A vehicle mile marker display and alarm system comprising:

circuit means for providing data corresponding to the current mile marker position of a vehicle as it travels along a roadway;

memory circuit means and vehicle operator actuated digital keyboard coupled to said memory circuit means permitting the vehicle operator to enter data corresponding to at least one upcoming mile marker location toward which the vehicle is travelling;

comparator circuit means coupled to said circuit means and to said memory circuit means for providing an output signal when the data corresponding to the current mile marker location has a predetermined relationship to the data in said memory circuit means; and alarm means coupled to said comparator circuit means for alerting the vehicle operator in response to the receipt of said output signal.

23. The system as defined in claim 22 and further including display means coupled to said circuit means for displaying the current mile marker location of the vehicle to the vehicle operator.

24. The system as defined in claim 23 wherein said memory circuit means includes a plurality of storage locations for storing data for a plurality of upcoming mile marker locations and scanning circuit means coupled between said storage locations and said comparator for sequentially comparing data corresponding to the current vehicle location with data in said storage locations.

* * * * *